(12) United States Patent
Nasta

(10) Patent No.: US 9,573,011 B1
(45) Date of Patent: Feb. 21, 2017

(54) SIDELINE EXERCISE EQUIPMENT

(71) Applicant: Matthew T. Nasta, Boulder, CO (US)

(72) Inventor: Matthew T. Nasta, Boulder, CO (US)

( * ) Notice: Subject to any disclaimer, the term of this patent is extended or adjusted under 35 U.S.C. 154(b) by 0 days.

(21) Appl. No.: 14/720,571

(22) Filed: May 22, 2015

Related U.S. Application Data

(60) Provisional application No. 62/001,717, filed on May 22, 2014.

(51) Int. Cl.
*A63B 26/00* (2006.01)
*A63B 21/00* (2006.01)

(52) U.S. Cl.
CPC ......... *A63B 21/00* (2013.01); *A63B 21/00047* (2013.01); *A63B 2210/00* (2013.01)

(58) Field of Classification Search
CPC ..... A63B 9/00; A63B 2009/006; A63B 17/00; A63B 17/02; A63B 17/04; A63B 21/00; A63B 21/00047; A63B 21/068; A63B 21/08; A63B 21/16; A63B 21/4027; A63B 21/4033; A63B 21/4034; A63B 21/4035; A63B 21/4037; A63B 21/4041; A63B 21/4045; A63B 21/4047; A63B 21/4049; A63B 22/14; A63B 22/16; A63B 22/18; A63B 22/20; A63B 22/201; A63B 22/203; A63B 71/0036; A63B 71/023; A63B 71/028; A63B 71/04; A63B 2071/0081; A63B 2071/024; A63B 2071/025; A63B 2071/026; A63B 2071/027; A63B 2210/00; A63B 2210/10; A63B 2210/50; A63B 2210/58; A63B 2225/09; A63B 2225/093;A63B 2225/10; A63B 2225/102; A63B 2225/105; A63B 2225/107; A63B 2225/72
See application file for complete search history.

(56) References Cited

U.S. PATENT DOCUMENTS

| 3,373,993 | A | * | 3/1968 | Oja | A63B 21/00181 |
| | | | | | 280/43.14 |
| 3,452,985 | A | * | 7/1969 | Zmura | A63B 67/04 |
| | | | | | 108/66 |
| 3,547,435 | A | * | 12/1970 | Scott | A63B 9/00 |
| | | | | | 482/34 |
| 4,087,089 | A | * | 5/1978 | Forrest | A63B 69/345 |
| | | | | | 473/445 |

(Continued)

*Primary Examiner* — Stephen Crow
*Assistant Examiner* — Gary D Urbiel Goldner
(74) *Attorney, Agent, or Firm* — Tillman Wright, PLLC; James D. Wright; David R. Higgins

(57) ABSTRACT

An exercise apparatus includes a plurality of stations and at least one harness assembly connecting the stations together. Each station includes a riser assembly having a top and a bottom, and a platform assembly coupled to the bottom of the riser assembly. Each platform assembly is adjustable between a first state, in which the platform assembly rests on a horizontal support surface, and a second state, in which the platform assembly is folded vertically against the respective riser assembly. Each riser assembly includes a lower riser and an upper riser that are coupled together such that the upper riser may be translated up and down. An exercise accessory is coupled to at least one of the riser assemblies. The apparatus is adjustable from a use state to a transport state, without disassembly, such that it may be moved from a first use location to a second use location.

20 Claims, 17 Drawing Sheets

(56) References Cited

U.S. PATENT DOCUMENTS

| | | | | |
|---|---|---|---|---|
| 4,256,300 A * | 3/1981 | Boucher | A63G 9/00 | 182/155 |
| 4,412,679 A * | 11/1983 | Mahoney | A63B 63/083 | 16/429 |
| 4,826,153 A * | 5/1989 | Schalip | A63B 21/06 | 482/94 |
| 4,881,734 A * | 11/1989 | Nye | A63B 63/083 | 248/284.1 |
| 4,951,944 A * | 8/1990 | Morgan | A63B 63/083 | 473/483 |
| 5,013,039 A * | 5/1991 | Cole | A63B 23/047 | 473/445 |
| 5,050,867 A * | 9/1991 | Rand | A63C 19/12 | 472/92 |
| 5,174,531 A * | 12/1992 | Perakis | A45D 20/12 | 248/124.1 |
| 5,352,170 A * | 10/1994 | Condo | A63B 69/201 | 482/83 |
| 5,671,900 A * | 9/1997 | Cutler | A47B 23/007 | 248/448 |
| 5,672,144 A * | 9/1997 | Hulme | A63B 23/0211 | 482/140 |
| 6,217,483 B1 * | 4/2001 | Kallassy | A63B 21/068 | 482/38 |
| 6,319,178 B1 * | 11/2001 | Webber | A63B 21/154 | 482/100 |
| 6,685,581 B2 * | 2/2004 | Krause | A63B 69/004 | 473/441 |
| 7,462,117 B2 * | 12/2008 | White | A63B 63/083 | 473/481 |
| 9,192,803 B2 * | 11/2015 | Cayo | A63B 21/0618 | |
| 2004/0180719 A1 * | 9/2004 | Feldman | A63B 21/002 | 463/36 |
| 2006/0148599 A1 * | 7/2006 | Haddix | A63B 63/00 | 473/535 |
| 2007/0155602 A1 * | 7/2007 | Huls | A63B 21/00181 | 482/140 |
| 2010/0048361 A1 * | 2/2010 | Smith | A63B 25/00 | 482/75 |
| 2011/0165972 A1 * | 7/2011 | Forrest, Sr. | A63B 69/002 | 473/445 |
| 2013/0213917 A1 * | 8/2013 | Rios Garcia Prieto | A63B 3/00 | 211/182 |
| 2014/0235375 A1 * | 8/2014 | Crosby | A63B 63/083 | 473/481 |
| 2015/0246263 A1 * | 9/2015 | Campanaro | A63B 23/03566 | 482/52 |

* cited by examiner

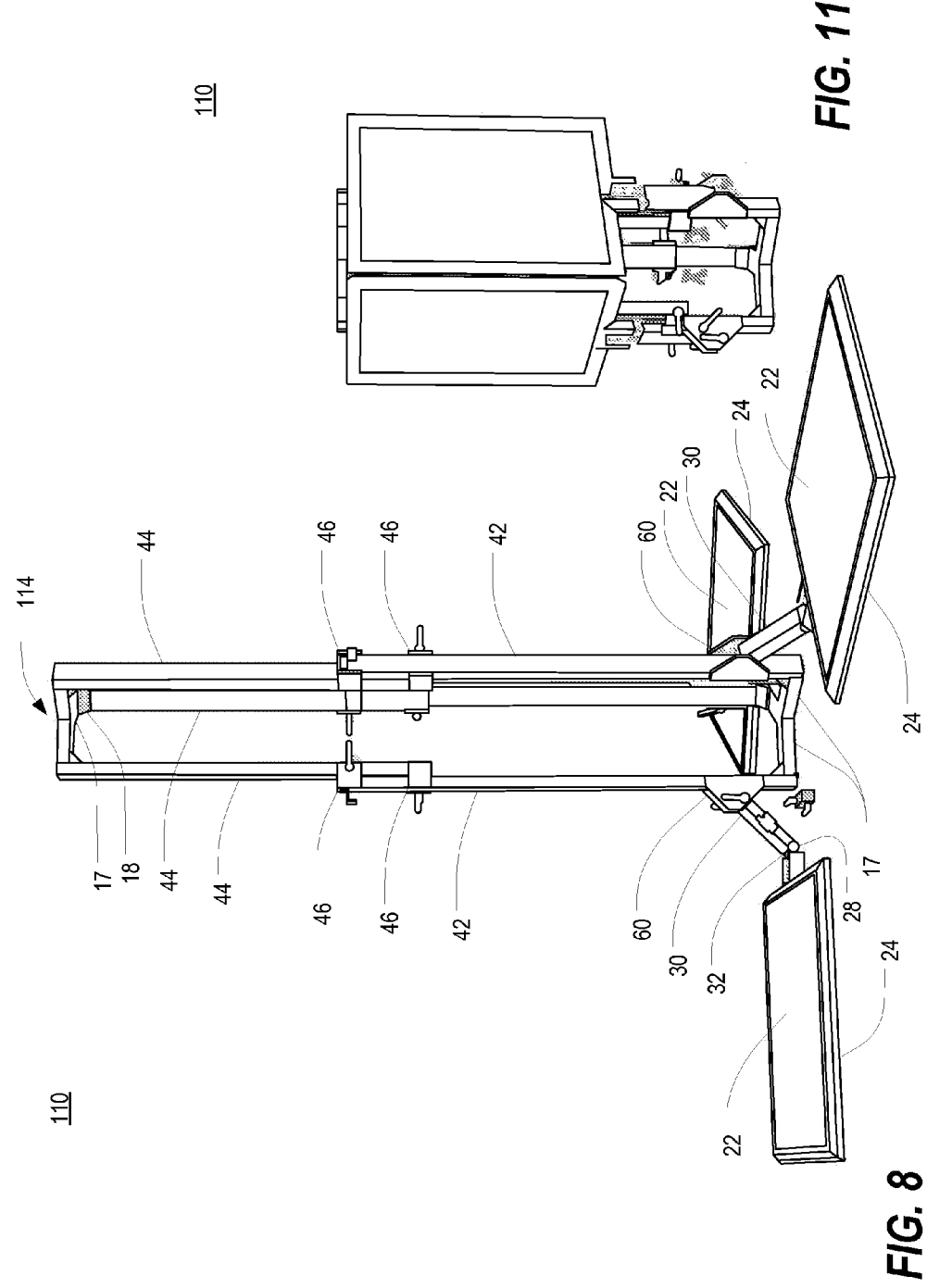

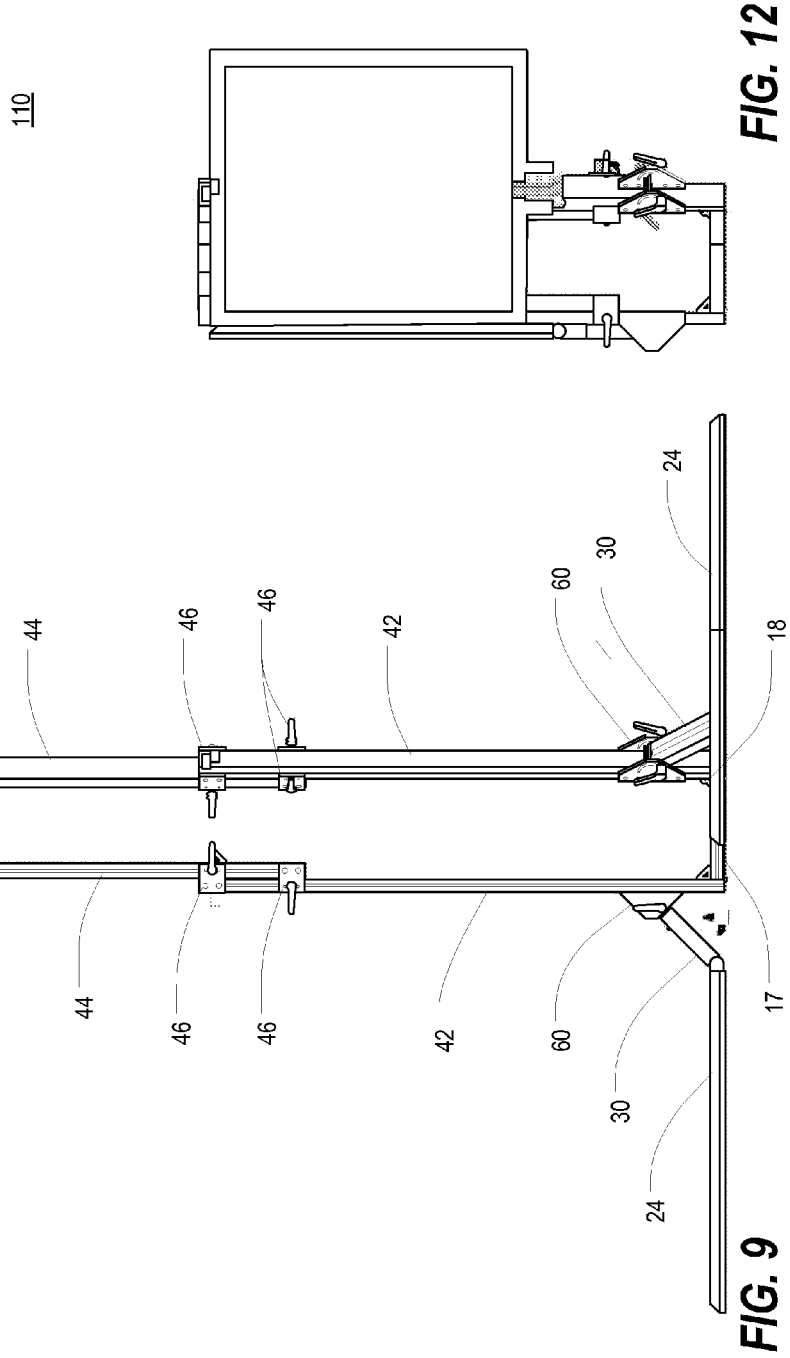

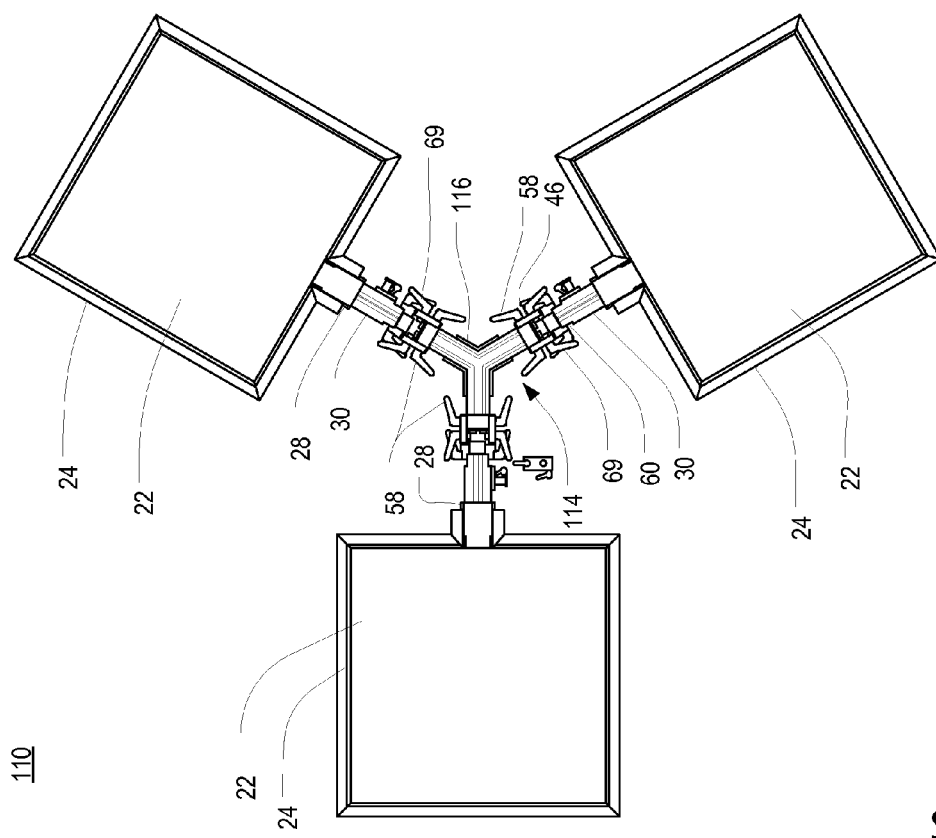

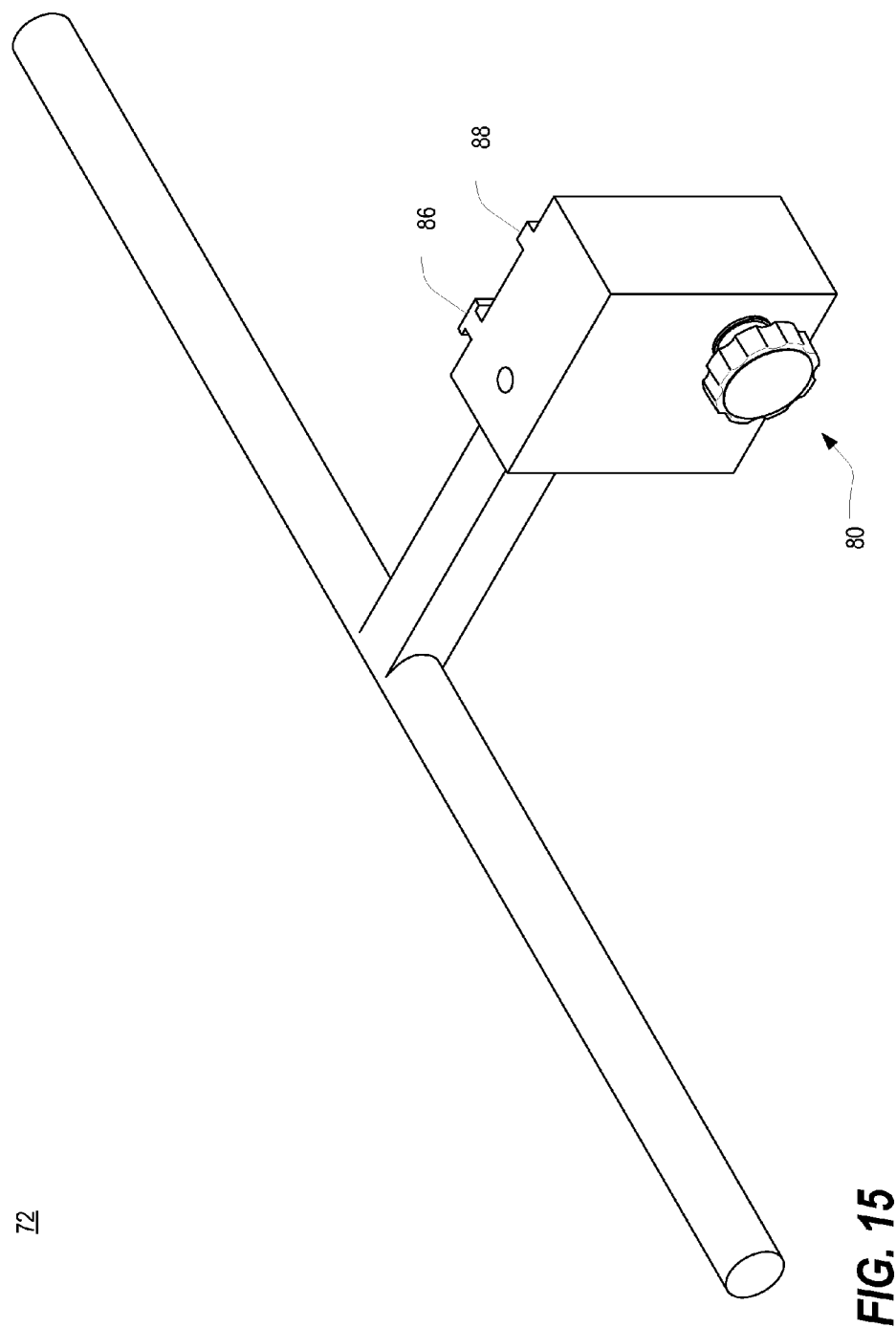

SIDELINE EXERCISE EQUIPMENT

CROSS-REFERENCE TO RELATED APPLICATION

The present application is a U.S. nonprovisional patent application of, and claims priority under 35 U.S.C. §119(e) to, U.S. provisional patent application Ser. No. 62/001,717, filed May 22, 2014, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to exercise equipment, and, in particular, to portable exercise equipment for use on the sideline, bench, or the like during athletic contests.

Background

Most, if not all exercise equipment used today in gyms and health clubs is very singularly focused, meaning it is designed for a single purpose: leg extensions for the quadriceps, lat pull downs for the latissimus muscles, and the like.

One type of training that has become more popular is suspension training, wherein using one's own body weight or the like is used as resistance. However, as this training has evolved and become more popular, the equipment needed to withstand such forces and demands either has to weigh hundreds or even thousands of pounds or be bolted to the floor for stability. For example, companies like TRX, GTX, and the like use the premise of rings of the type used in the men's Olympics gymnastics together with the user's bodyweight for the resistance. These devices can be attached to an existing pull up bar, which in turn is usually mounted to the wall with bolts or screws, or a very heavy piece of gym equipment with hundreds of pounds of plated or stack weights. In either case, the equipment is clearly not transportable or usable in more than one location, and in particular cannot be easily moved to the sideline of a football field or other locations and used there.

A need exists for exercise equipment that can be used to provide a weight room "experience" on the sideline but that overcomes the confines of very large and megalithic equipment as described above.

Additionally or alternatively, a need exists for sideline exercise equipment that utilizes flat surfaces on the structure itself, such as platform bases (top and bottom), vertical columns, a canopy, or the like, for advertising space, thereby making the equipment itself more affordable for athletic programs that might not otherwise be able to pay for the equipment.

SUMMARY OF THE PRESENT INVENTION

Broadly defined, the present invention according to one aspect is an exercise apparatus as shown and described.

Broadly defined, the present invention according to another aspect is an exercise apparatus having a plurality of stations as shown and described.

In a feature of this aspect, the plurality of stations are connected together via one or more harness assemblies.

Broadly defined, the present invention according to another aspect is an exercise apparatus including: a plurality of stations; and at least one harness assembly connecting the plurality of stations together. Each station may include a riser assembly, having a top and a bottom, and a platform assembly coupled to the bottom of the riser assembly.

In a feature of this aspect, in each station, the platform assembly is coupled to the bottom of the riser assembly via an adjustable hinge joint.

In another feature of this aspect, each platform assembly includes an exercise pad. In a further feature, each platform assembly includes a frame supporting the exercise pad.

In another feature of this aspect, each platform assembly is adjustable between a first state, in which the platform assembly rests a horizontal support surface, and a second state, in which the platform assembly is folded vertically against the respective riser assembly.

In another feature of this aspect, each riser assembly includes a lower riser and an upper riser that are coupled together such that the upper riser may be translated up and down relative to the lower riser. In further features, each lower and upper riser includes a primary column comprising a length of extruded material; each primary column includes a plurality of T-slots; each riser assembly includes a carriage bracket to facilitate the translation; and/or each carriage bracket includes a clamp to fix the position of the upper riser relative to the lower riser.

In another feature of this aspect, one of the at least one harness assembly connects the tops of the riser assemblies together.

In another feature of this aspect, one of the at least one harness assembly connects the bottoms of the riser assemblies together.

In another feature of this aspect, the stations are connected spoke-like around at least one harness assembly.

In another feature of this aspect, an exercise accessory is coupled to at least one of the riser assemblies. In further features, the exercise accessory is a first exercise accessory coupled to a first riser assembly, and wherein a second exercise accessory is coupled to a second riser assembly; the first exercise accessory and the second exercise accessory are of different types and perform different functions; the exercise accessory is removable from the at least one of the riser assemblies; and/or the exercise accessory is adjustably positionable, in the vertical dimension, along the at least one of the riser assemblies.

In another feature of this aspect, the apparatus is adjustable from a use state to a transport state, without disassembly, such that it may be moved from a first use location to a second use location, and is further adjustable from the transport state to the use state, without assembly, such that it may be used in the second use location. In a further feature, the exercise apparatus further includes a plurality of wheels on which the apparatus is rolled in its transport state.

Broadly defined, the present invention according to another aspect is a portable exercise apparatus including: a plurality of separately usable workout stations, each station adapted for use by an athlete on the sidelines of an athletic field, court, or other playing surface, wherein each station has a riser assembly, and a brace structure connected to a lower portion of the riser assembly to stabilize the riser assembly, and the apparatus, against the sidelines of the field, court, or other playing surface; at least one harness assembly connecting the plurality of stations together; and an adjustable exercise accessory disposed at a user-controlled height on at least one of the riser assemblies; wherein the workout stations and harness assembly may be collapsed, without disassembly thereof, for transport to and from the sidelines of the field, court, or other playing surface.

In a feature of this aspect, the brace structure of each station includes an angled support that may be bolted to the ground or floor on the sidelines of the field, court, or other playing surface and provides support for the riser assemblies.

In another feature of this aspect, the brace structure of each station includes a platform assembly that rests on the ground or floor on the sidelines of the field, court, or other playing surface and provides support for the riser assemblies. In further features, in each station, the platform assembly is coupled to the bottom of the riser assembly via an adjustable hinge joint; each platform assembly includes an exercise pad; and/or each platform assembly is adjustable between a first state, in which the platform assembly rests a horizontal support surface, and a second state, in which the platform assembly is folded vertically against the respective riser assembly.

In another feature of this aspect, each riser assembly includes a lower riser and an upper riser that are coupled together such that the upper riser may be translated up and down relative to the lower riser. In further features, each lower and upper riser includes a primary column comprising a length of extruded material; each primary column includes a plurality of T-slots; each riser assembly includes a carriage bracket coupling the upper riser to the lower riser to facilitate the translation; and/or each carriage bracket includes a clamp to fix the position of the upper riser relative to the lower riser.

In another feature of this aspect, the at least one harness assembly connects ends of the riser assemblies together.

In another feature of this aspect, the riser assemblies of the workout stations are connected spoke-like around at least one harness assembly.

In another feature of this aspect, the exercise accessory is a first exercise accessory coupled to a first riser assembly, and wherein a second exercise accessory is coupled to a second riser assembly. In a further feature, the first exercise accessory and the second exercise accessory are of different types and perform different functions.

In another feature of this aspect, the exercise accessory is removable from the at least one of the riser assemblies.

In another feature of this aspect, the apparatus is adjustable from a use state to a transport state, without disassembly, such that it may be moved from a first use location to a second use location, and is further adjustable from the transport state to the use state, without assembly, such that it may be used in the second use location. In a further feature, the portable exercise apparatus further includes a plurality of wheels on which the apparatus is rolled in its transport state.

Broadly defined, the present invention according to another aspect is a portable exercise apparatus including: a plurality of separately usable workout stations, each station adapted for use by an athlete on the sidelines of an athletic field, court, or other playing surface, wherein each station includes a riser assembly, including a lower riser and an upper riser that are coupled together such that the upper riser may be translated up and down relative to the lower riser; at least one harness assembly connecting the plurality of stations together; and an adjustable exercise accessory disposed at a user-controlled height on at least one of the riser assemblies; wherein the workout stations and harness assembly may be collapsed, without disassembly thereof, for transport to and from the sidelines of the field, court, or other playing surface.

Broadly defined, the present invention according to another aspect is a portable exercise apparatus including: a plurality of separately usable workout stations, each station adapted for use by an athlete on the sidelines of an athletic field, court, or other playing surface, wherein each station includes a riser assembly, including a vertical member having a channel running substantially along its entire length; at least one harness assembly connecting the plurality of stations together; and an adjustable exercise accessory coupled to at least one of the riser assemblies, via the channel of the vertical member thereof, at a user-controlled height; wherein the workout stations and harness assembly may be collapsed, without disassembly thereof, for transport to and from the sidelines of the field, court, or other playing surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 8 is side perspective view of another exercise apparatus in accordance with one or more preferred embodiments of the present invention, shown in its use state;

FIG. 9 is a side plan view of the exercise apparatus of FIG. 9;

FIG. 10 is a top plan view of the exercise apparatus of FIG. 9;

FIG. 11 is a side perspective view of the exercise apparatus of FIG. 8, shown in its transport state;

FIG. 12 is a side plan view of the exercise apparatus of FIG. 11;

FIG. 13 is a top plan view of the exercise apparatus of FIG. 11;

FIG. 15 is an isometric view of a pull-up bar accessory;

DETAILED DESCRIPTION

Figure 1:
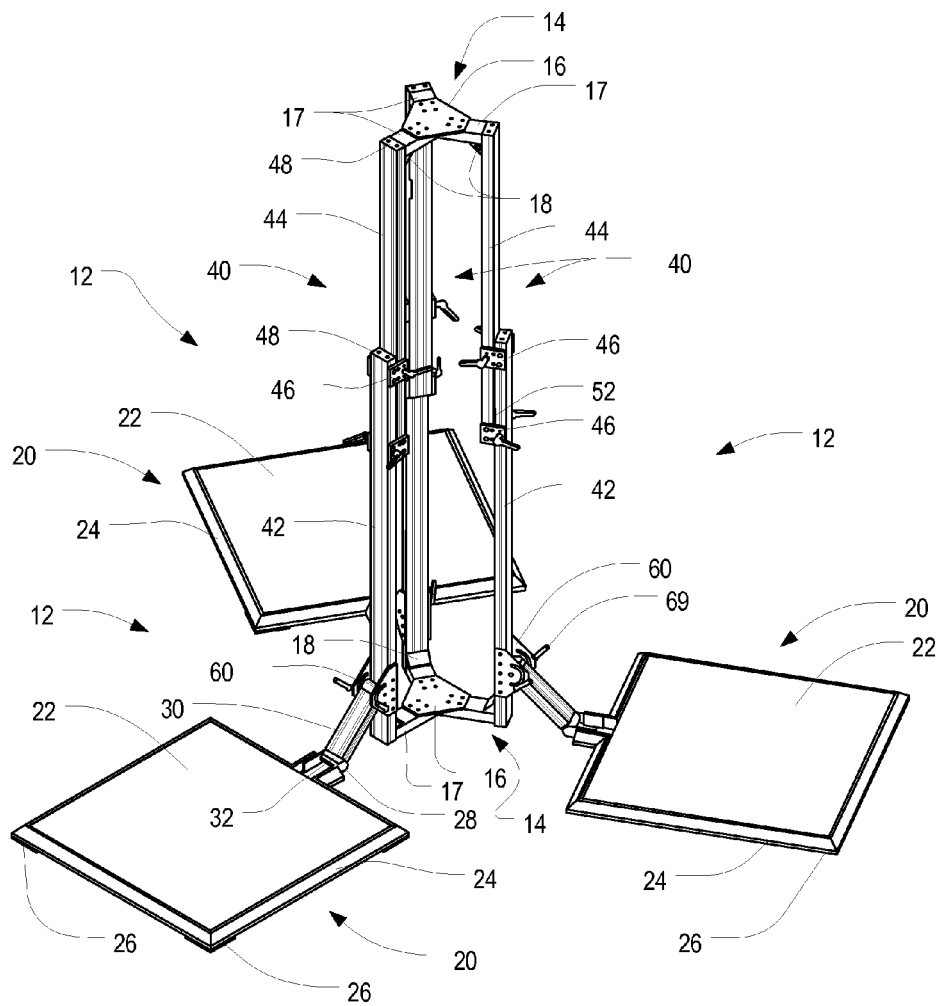
FIG. 1 is an isometric view of an exercise apparatus in accordance with one or more preferred embodiments of the present invention, shown in its use state.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
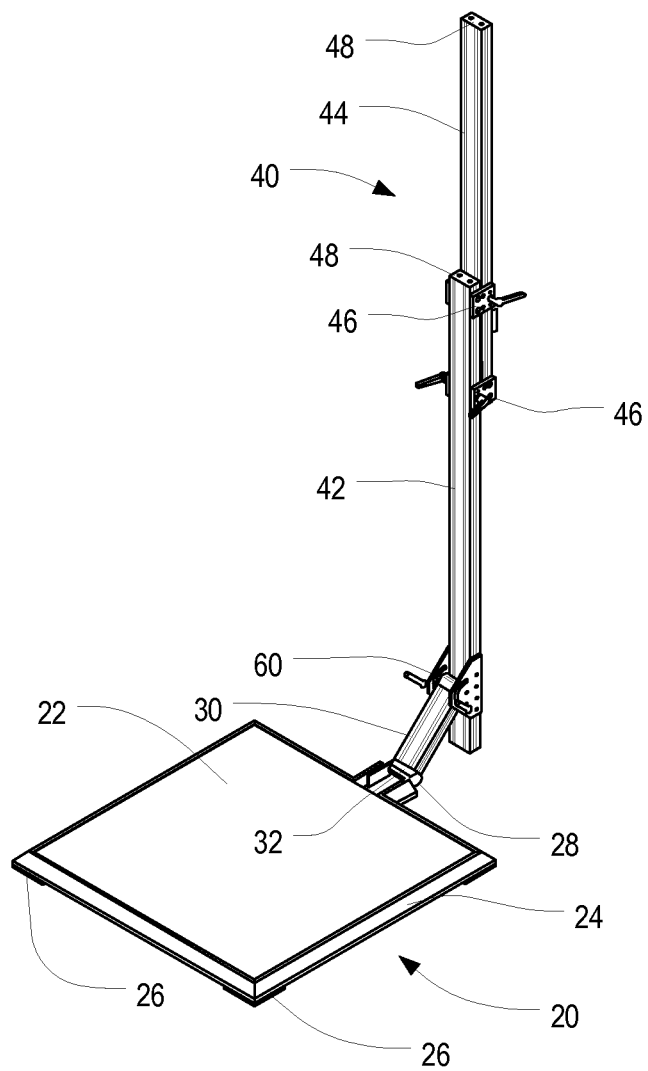
FIG. 2 is an isometric view of one of the stations of FIG. 1.

FIG. 1 is an isometric view of an exercise apparatus 10 in accordance with one or more preferred embodiments of the present invention, shown in its use state. As shown therein, the exercise apparatus 10 includes a plurality of stations 12 connected together via one or more harness assemblies 14. FIG. 2 is an isometric view of one of the stations 12 of FIG. 1. In at least some embodiments, the stations 12 are similar to one another, while in others a station 12 similar those described herein may be combined with one or more stations or other units of different design. Each station 12 in FIG. 1 includes a platform assembly 20 coupled to the bottom of a riser assembly 40 via an adjustable hinge joint 60. Each platform assembly 20 includes a platform surface or exercise pad 22, a platform or pad frame 24, a plurality of feet 26 supporting the frame 24, a hinge assembly 28, and an extension strut or gusset 30. The members of the platform or pad frame 24 may be held together by 90 degree strap brackets. The hinge assembly 28 is integral with, or connected to, the pad frame 24, and is hingedly connected to the extension strut 30 via a hinge component 32 at one end of the strut 30. In at least some embodiments, the extension strut 30 is of extruded construction. Also in at least some embodiments, the hinge component 32 may include a 180 degree living hinge, and/or the adjustable hinge joint 60 may include a 180 degree hinge plate.

Figure 4:
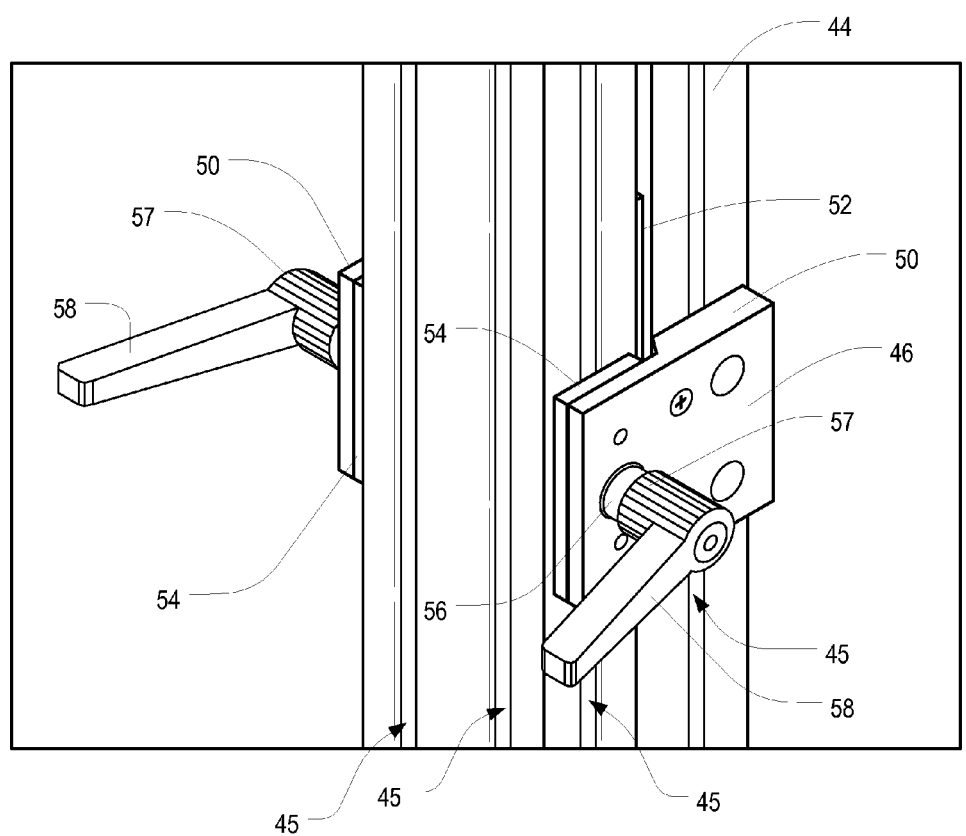
FIG. 4 is an enlarged fragmentary isometric view of a lower riser, an upper riser, and a carriage bracket of FIG. 2, shown in isolation.

Each riser assembly 40 includes a lower riser 42 and an upper riser 44 that are connected together via one or more linear guide plates or carriage brackets 46 such that the upper riser 44 may be translated up and down relative to the lower riser 42. FIG. 4 is an enlarged fragmentary isometric view of a lower riser 42, an upper riser 44, and a carriage bracket 46 of FIG. 2, shown in isolation. In some embodiments, each carriage bracket 46 may include two side plates 50 and a central guide bearing pad or plate 52 in a generally H-shaped configuration. The side plates 50 are coupled to sides of the risers 42,44 such that the carriage bracket 46 may translate relative to at least one of the risers 42,44. In at least some embodiments, this translation may be facilitated using one or more side guide bearing pad or clamp plate 54 that is coupled to at least one of the side plates 50 via a threaded fastener assembly 56. The fastener assembly 56 may include a textured head 57, a handle 58, or both so as to make it easier to tighten and loosen the fastener 56, and thus the clamp plate 54, by hand, i.e., without the use of tools.

Figure 3:
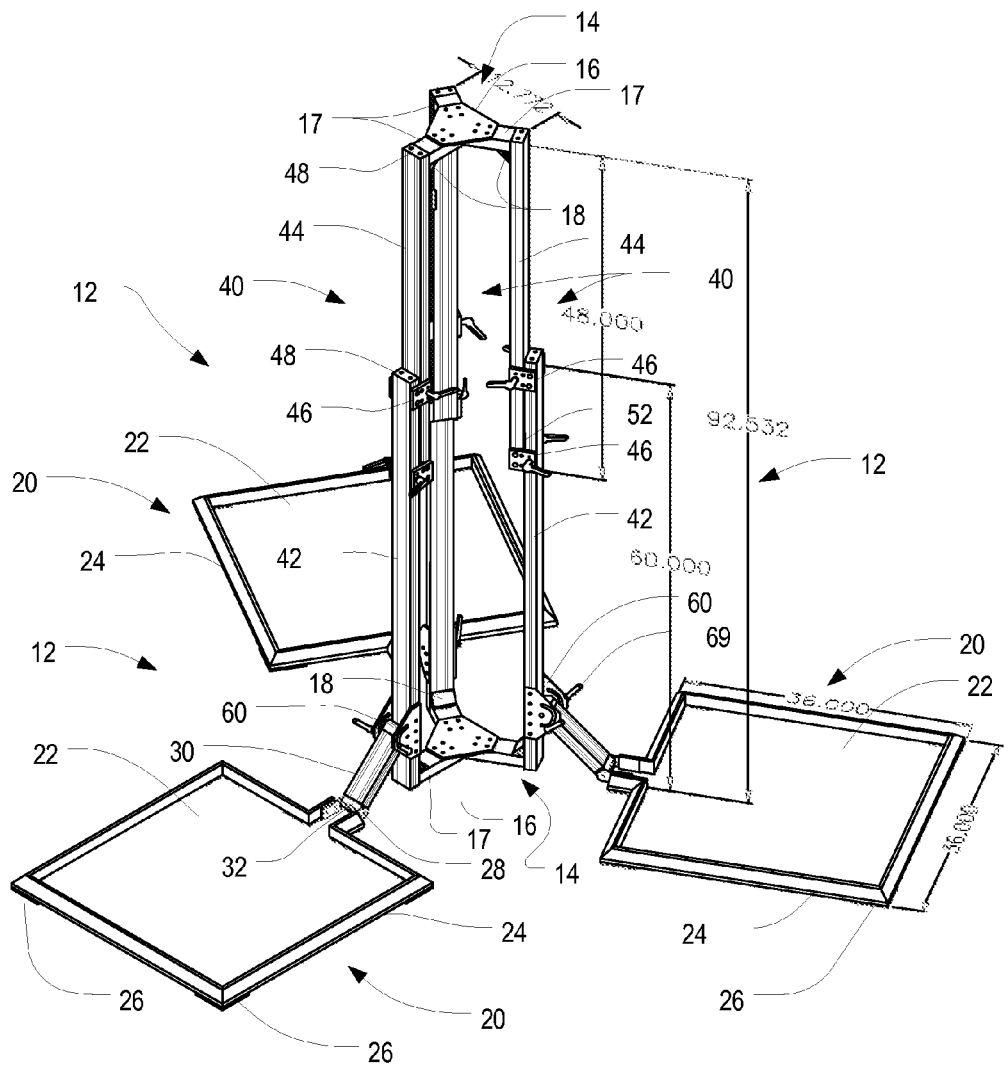
FIG. 3 is an isometric view of the exercise apparatus of FIG. 1, shown with the exercise pads removed.

FIG. 3 is an isometric view of the exercise apparatus 10 of FIG. 1, shown with the exercise pads 22 removed, illustrating dimensions of one contemplated commercial product. In at least some embodiments, it is preferred that the apparatus be capable of supporting accessories at a height of at least up to eight feet so as to accommodate the vast majority of users. Some accessories, for example, are best used when located above a user's head. However, utility may still be achieved with accessories located, for example, at head height, shoulder height, chest height, waist height, or lower heights. Generally, the accessories are mounted to the risers as described below. It is thought that use of a lower riser that is approximately five feet in length (height) and a upper riser that is approximately four feet in length (height) are suitable for providing an appropriate range of accessory height locations.

Figure 5:
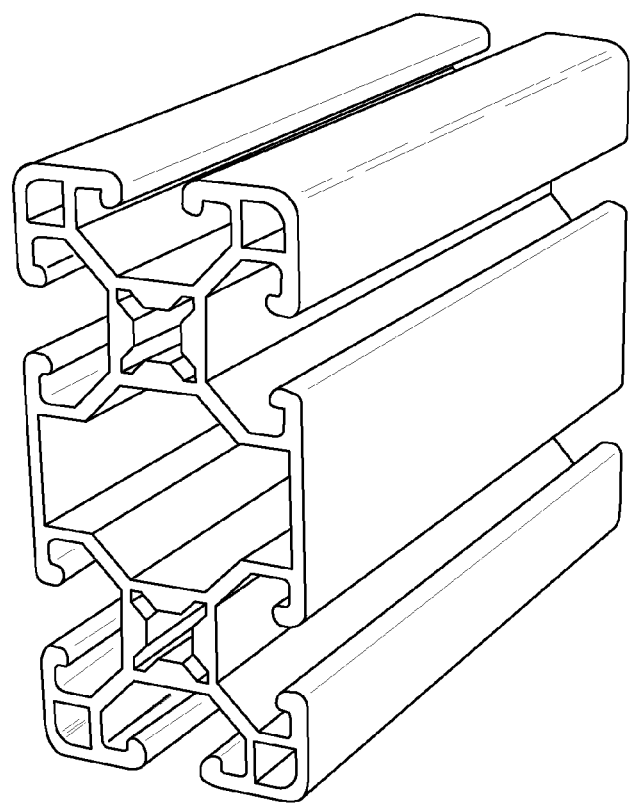
FIG. 5 is a perspective view of a section of extruded T-slot aluminum having a cross-section suitable for use as part of the risers of FIG. 4.
Figure 6:
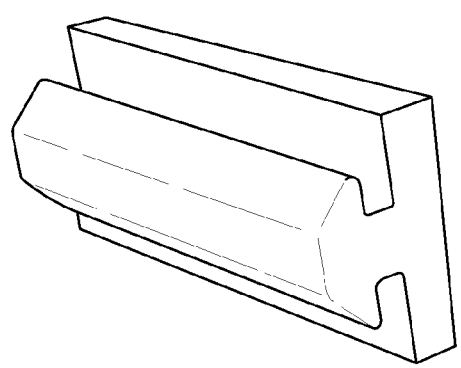
FIG. 6 is a perspective view of the side guide bearing pad or clamp plate of FIG. 4.

In at least some embodiments, the lower riser 42 and upper riser 44 are primarily of extruded construction but may have end caps 48. For example, the lower and upper risers 42,44 may be columns of extruded aluminum, each of which includes one or more T-shaped channels that go up and down the entire length thereof. In this regard, FIG. 5 is a perspective view of a section of extruded T-slot aluminum having a cross-section suitable for use as part of the risers 42,44 of FIG. 4, and FIG. 6 is a perspective view of the side guide bearing pad or clamp plate 54 of FIG. 4. As shown in FIG. 5, a total of six T-shaped channels 45 are arranged in the extruded body. Other channels may exist as well; such additional channels may be arranged for different functions or simply to reduce the amount of material required in the extrusion. Furthermore, different numbers of T-shaped channels 45 may alternatively be provided. The T-shape of the channels 45 may be particularly suitable for receiving the head of a fastener or another T- or even L-shaped structure, such as that of the bearing pad or clamp plate 54 of FIG. 6, and for retaining such structure therein, but while also permitting the structure to be moved within the channel 45. Other examples of such fasteners and other structures may be described elsewhere herein.

With reference to FIG. 6, the side guide bearing pad or clamp plate 54 includes a flat body portion 53 with a T-shaped structure 55 extending from one side thereof. In at least some embodiments, the bearing pads or clamp plates 54 are made of nylon or other lower-friction material in order to allow for smooth transitions and eliminate friction caused by metal on metal. The entire object may be of extruded construction such that the T-shaped structure 55 extends the entire length of the flat body portion 53. With reference to FIG. 4, the bearing pads or clamp plates 54 may be fastened to interior surfaces of the side plates 50 such that the T-shaped structures 55 may be positioned in the T-shaped channels 45 of the risers 42,44. The fastener assemblies 56 may then be utilized to tighten or loosen the side plates 50 against the sides of the risers 42,44 as described previously.

It will be appreciated that other structures, mechanisms, and designs may be used to facilitate the coupling of one riser 42,44 to another and/or to couple other structures to a riser 42,44. For example, risers (not shown) may be provided that have apertures distributed along their length with fasteners or support pins arranged to fit therein, thereby permitting the position of one riser 44 to be adjusted relative to another riser 42. Such apertures may, for example, be evenly spaced (such as every 2 inches, 6 inches, or the like). However, the use of infinitely adjustable riser assemblies 40 advantageously gives users a very tailored and customized fit.

Figure 7:
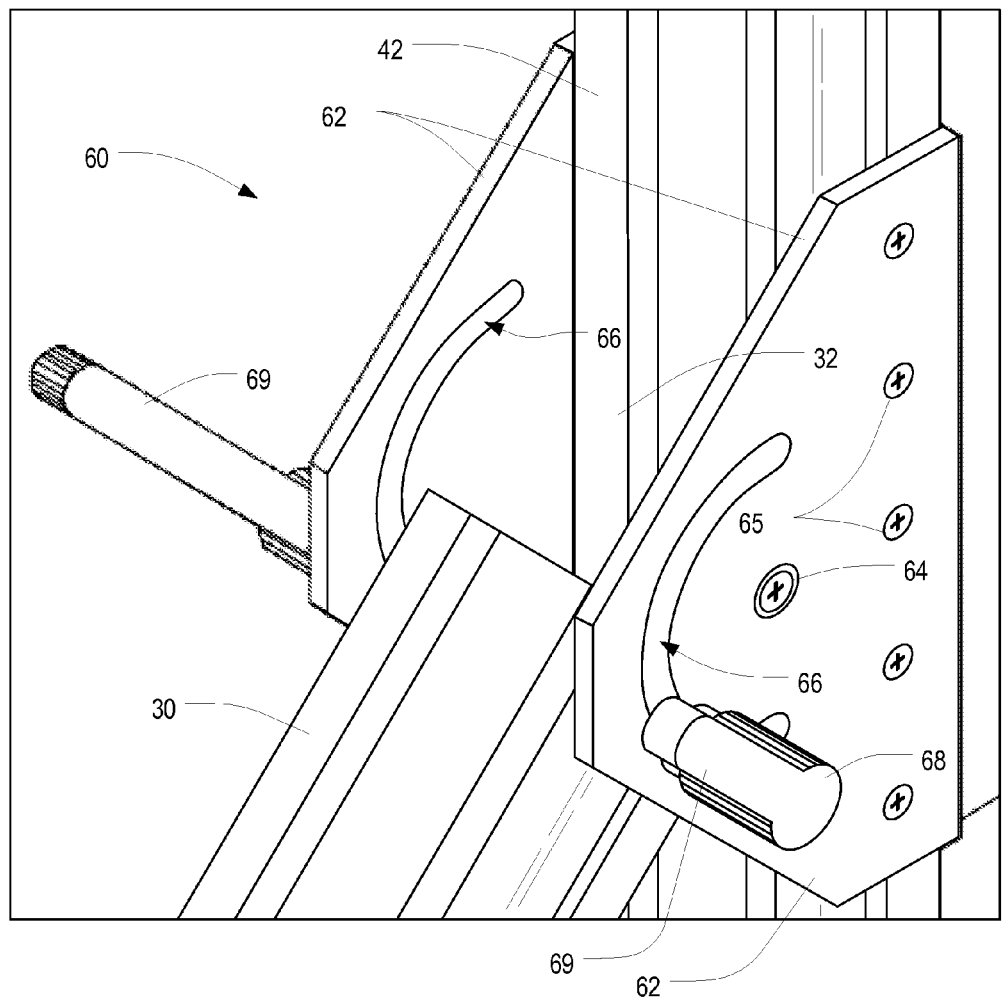
FIG. 7 is an enlarged fragmentary isometric view of a lower riser, an upper riser, and a carriage bracket of FIG. 1, shown in isolation.

FIG. 7 is an enlarged fragmentary isometric view of a lower riser 42, an extension strut 30, and an adjustable hinge joint 60 of FIG. 1, shown in isolation. Each adjustable hinge joint 60 may include two side plates 62 coupled together via a hinge axle or pivot pin 64 that extends through a first hinge component 32 at one end of the extension strut 30. The side plates 62 may be attached to sides of the lower riser 42 by screws 65 or other means. Each side plate 62 includes a curved slot 66 having a uniform radius centered upon the pivot pin 64. A clamp 68 extends through the slot 66 and into, through, or against the extension strut 30 such that the extension strut 30 may be rotated relative to the lower riser 42. The clamp 68 may include a handle 69 so as to make it easier to tighten and loosen the clamp 68, and thus adjust the rotational angle of the extension strut 30 relative to the lower riser 42, by hand, i.e., without the use of tools.

Referring again to FIG. 1, each harness assembly 14 includes a cross member connecting plate or central reinforcement plate 16 and a plurality of connection cross members or spokes 17, wherein each spoke 17 is connected at one end to a respective riser assembly 40 and at the other end to the reinforcement plate 16. In at least some embodiments, the reinforcement plate 16 may be omitted, and the respective spokes are simply connected to each other. In the illustrated embodiment, the spokes 17 are connected to an end of either a lower or upper riser 42,44, and the connections are reinforced with a 90 degree bracket or corner brace 18, but other arrangements are likewise possible.

The exercise apparatus 10 may be adjusted between the state shown in FIGS. 1 and 3, in which it may be used to support exercise activities, and an alternative state in which the apparatus 10 can be transported and stored more easily. In this regard, FIGS. 8-10 are a side perspective view, a side plan view, and a top plan view, respectively, of another exercise apparatus 110 in accordance with one or more preferred embodiments of the present invention, shown in its use state, and FIGS. 11-13 are a side perspective view, a side plan view, and a top plan view, respectively, of the exercise apparatus 110 of FIG. 8, shown in its transport state. The apparatus 110 is generally similar to the apparatus of FIGS. 1-7, but with a few differences in implementation details. For example, the apparatus 110 of FIGS. 8-13 includes an alternative harness assembly 114. The alternative harness assembly 114 includes spokes 17, but rather than a central reinforcement plate, the assembly 114 includes a plurality of corner brackets 116 between adjacent spokes 17.

Notably, the apparatus 110 of FIGS. 8-13 (like the apparatus 10 of FIGS. 1-7) may be adjusted from its use state to its transport state as follows. The clamp plates 54 of the carriage brackets 46 of each station 12 are loosened such that the upper riser 44 may be translated downward relative to the lower riser 42, and the clamp plates 54 are retightened. The clamps 68 of the adjustable hinge joint 60 of each station 12 are loosened such that the platform assembly 20 is rotated upward, such that the exercise pad 22 and pad frame 24 are folded flat against the riser assembly 40, and the clamps 68 are retightened.

The apparatus 10,110 of the present invention is a lightweight, multi-user, multi-functioning piece of equipment. A significant advantage of the apparatus 10,110 of the present invention is their portability. If an athlete cannot have access to a weight room facility and all that such a facility has to help the athlete's performance during a game, then the weight room facility and its benefits are of no use to the athlete when a game is actually underway. Because the apparatus 10,110 is portable, they can essentially be utilized nearly anywhere, in conjunction with any sport.

Folded up, the apparatus 10,110 may utilize two wheels or casters underneath one of the platform assemblies 20 to enable moving the device without having to completely lift it off the ground. For example, the wheels or casters may look and function much like a hand truck, raising and lowering in opposition to one of the platform assemblies 20. Once the apparatus 10,110 is placed in a desired location, the platform assemblies 20 may be unfolded and locked into place to give the user a place to stand, with the user's weight helping to stabilize the apparatus 10,110. In particular, the apparatus 10,110 may be positioned along a football or soccer field sideline, or adjacent a basketball court. Once all three struts 30 are locked in, and each riser assembly 40 can be adjusted to a desired height. In at least some embodiments, the riser assemblies 40 may be adjusted up to a height of 8 feet, and in some of these embodiments, the riser assemblies may be adjusted to even greater heights. The apparatus 10,110 is then ready for use.

The apparatus 10,110 supports various accessories (not shown in FIGS. 1-13) that may be utilized by athletes and other users to work out, stretch, maintain activity, and other purposes along the sideline, court, or the like. At least some accessories may be attached and infinitely adjusted via the T-slot channels in the risers 42,44. In at least some embodiments, accessories may be attached with an O-ring on a 5/16" carriage bolt which can slide up and down the T-slot aluminum channels for customized height and position.

Figure 14A:
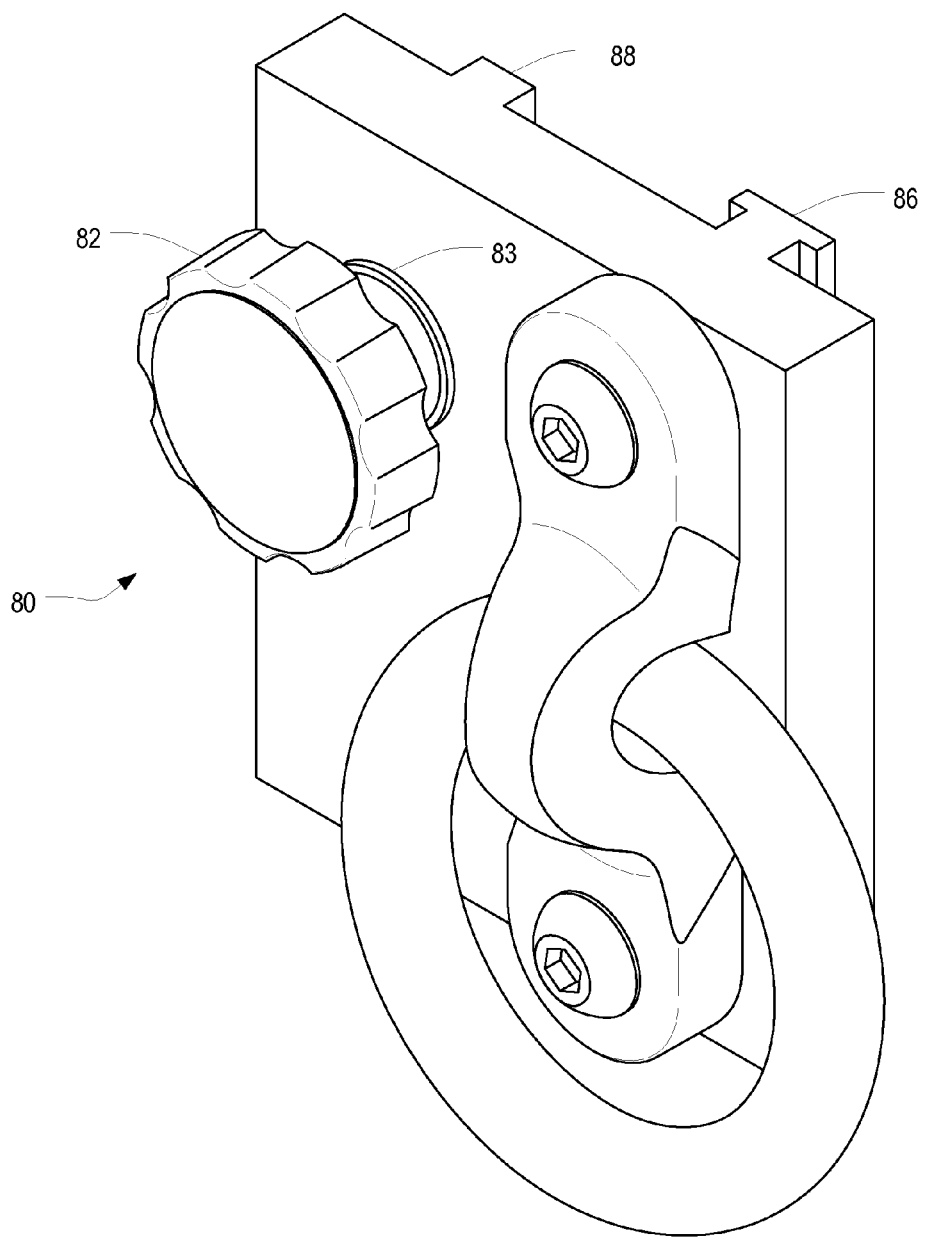
FIGS. 14A-14C are an isometric view, top view, and back view, respectively, of a carabiner link accessory.
Figure 14B:
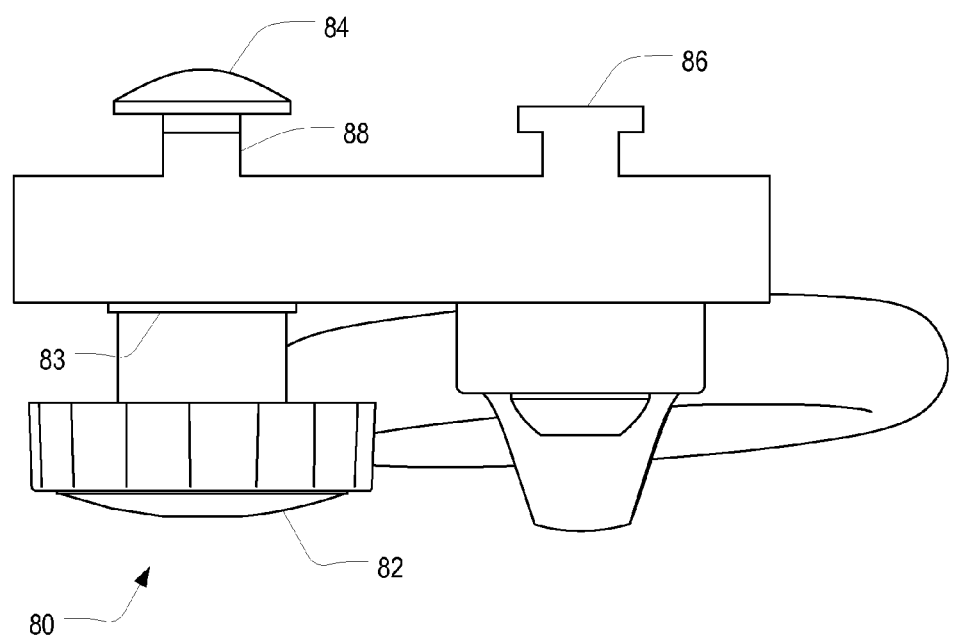
Figure 14C:
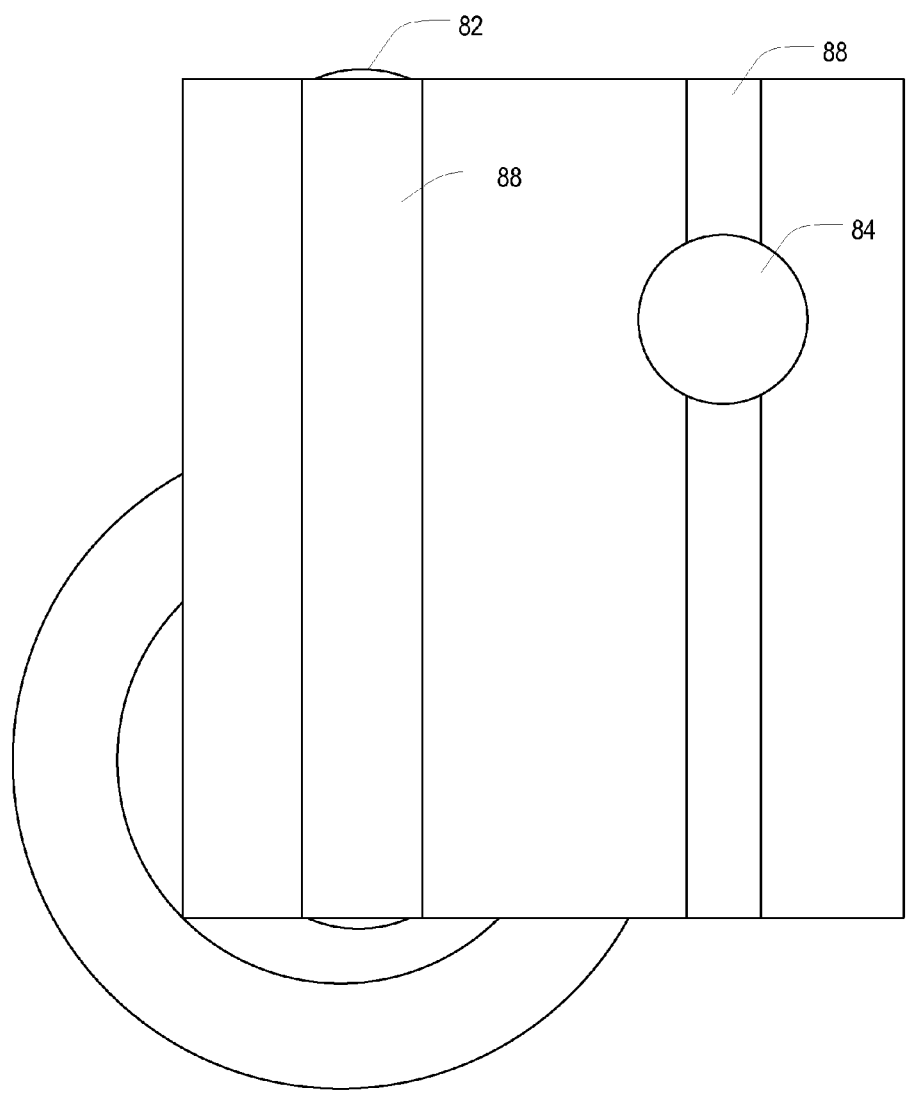
Figure 16:
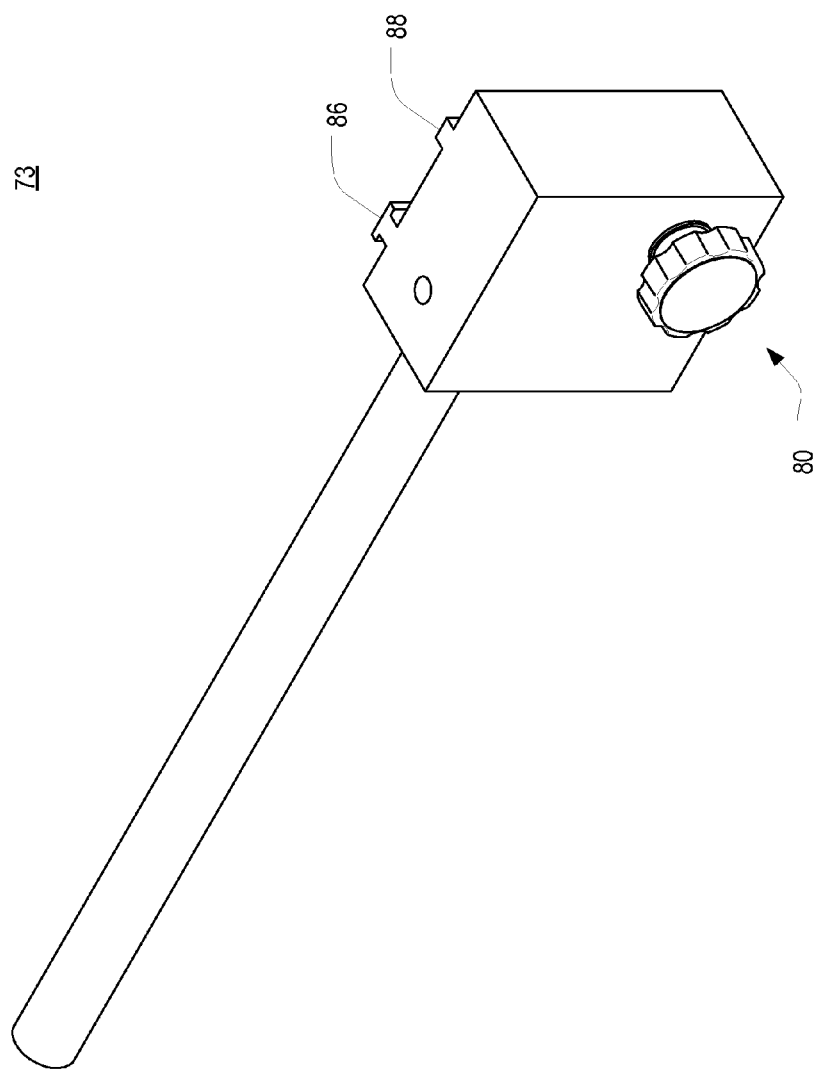
FIG. 16 is an isometric view of a roller accessory.
Figure 17:
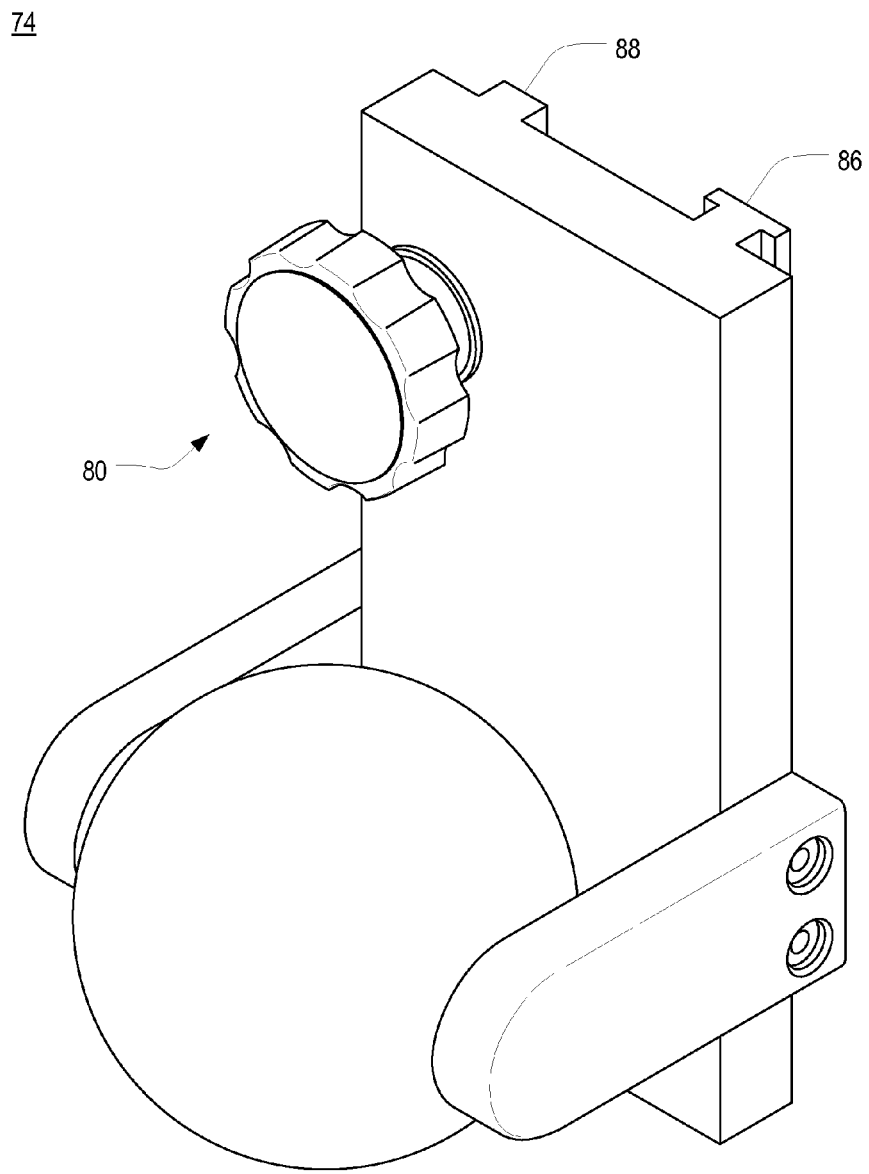
FIG. 17 is an isometric view of a trigger point accessory.
Figure 18:
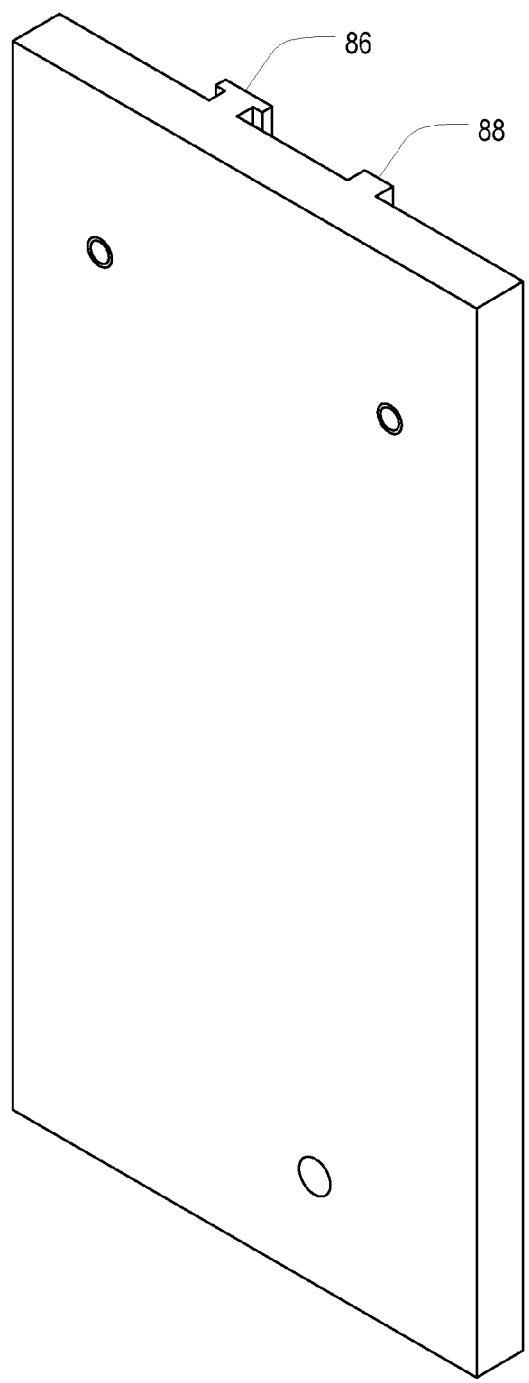
FIG. 18 is an isometric view of a forearm plate accessory.

Some specific accessories are shown in FIGS. 14-18, wherein FIGS. 14A-14C are an isometric view, top view, and back view, respectively, of a carabiner link accessory 71; FIG. 15 is an isometric view of a pull-up bar accessory 72; FIG. 16 is an isometric view of a roller accessory 73; FIG. 17 is an isometric view of a trigger point accessory 74; and FIG. 18 is an isometric view of a forearm plate accessory 75. As perhaps best illustrated in FIGS. 14A-14C, each of the illustrated accessories includes a main body having a flat rear surface from which a T-shaped ridge 86 and a square ridge 88 extend. A fastener assembly 80 extends through a cylindrical opening in the main body; as best understood from FIGS. 14B and 14C, the fastener assembly (and cylindrical opening) extend through the square ridge 88. The fastener assembly 80 includes a bolt (not shown), a handle 82, and one or more washer 83, where the bolt head 84 extends from the square ridge 88. The T-shaped ridge 86 and the square ridge 88 are sized and spaced such that they fit into the T-shaped channels 45 in the risers 42,44. With the fastener assembly 80 installed, the bolt head 84 fits into one T-shaped channel 45 and the T-shaped ridge 86 fits into an adjacent T-shaped channel 45. The main body of each accessory 71,72,73,74,75 may thus be positioned by loosening the respective handle 82, sliding the main body of the accessory via the ridges 86,88 and grooves 45 until the accessory is positioned in a desired location, and tightening the handle 82. It will be appreciated that the illustrated accessories are merely exemplary in nature; exercise accessories may include, but are not limited to, rubber and/or other resistance bands, nylon and/or other suspension straps, foam rollers, calf slants for stretching, trigger point balls, steps or platforms, forearm rollers and/or forearm massagers, chin-up bars (lumbar traction), and inversion benches. Other (non-exercise) accessories may likewise be provided, including flat screen monitors, LED streaming marketing banners, vibrating cams, cold lasers, and lights for nighttime use.

Although in the illustrated embodiment there are three stations 12, that does not limit the number of users to three. For example, someone can stand in between the platforms and use one of the many exercise accessories that may be included, thereby allowing for up to six simultaneous users. There is also the option of placing some of the exercise accessories on the bottom leg/platform for resistances coming from the ground and not perpendicular to the body for various activities.

Another advantageous feature of the apparatus 10,110 of the present invention is the use of flat surfaces that provide advertising and other opportunities for a school, club, or professional program making use of them. For example, a lot of advertising dollars traditionally go into sidelines, fences, buildings, and the like. The apparatus 10,110 gives a school, club, or professional team the ability to put their logo or mascot on the platform assemblies 20, or a potential ad space for a donor or advertiser to have his or her business visible right on the sideline. Thus, a school, club, or professional program may cover the purchase cost of the apparatus 10,110 with donations or advertising dollars from boosters/sponsors, local businesses who want to advertise, and the like. Alternatively, trainers or the owners of training facilities making use of the apparatus 10,110 may advertise their own services or facilities when they go to tradeshows, do lectures, or participate in other outside events. The apparatus 10,110 provides another creative way to get noticed and draw attention to both the apparatus 10,110 and the services or facilities being promoted.

Figure 19:
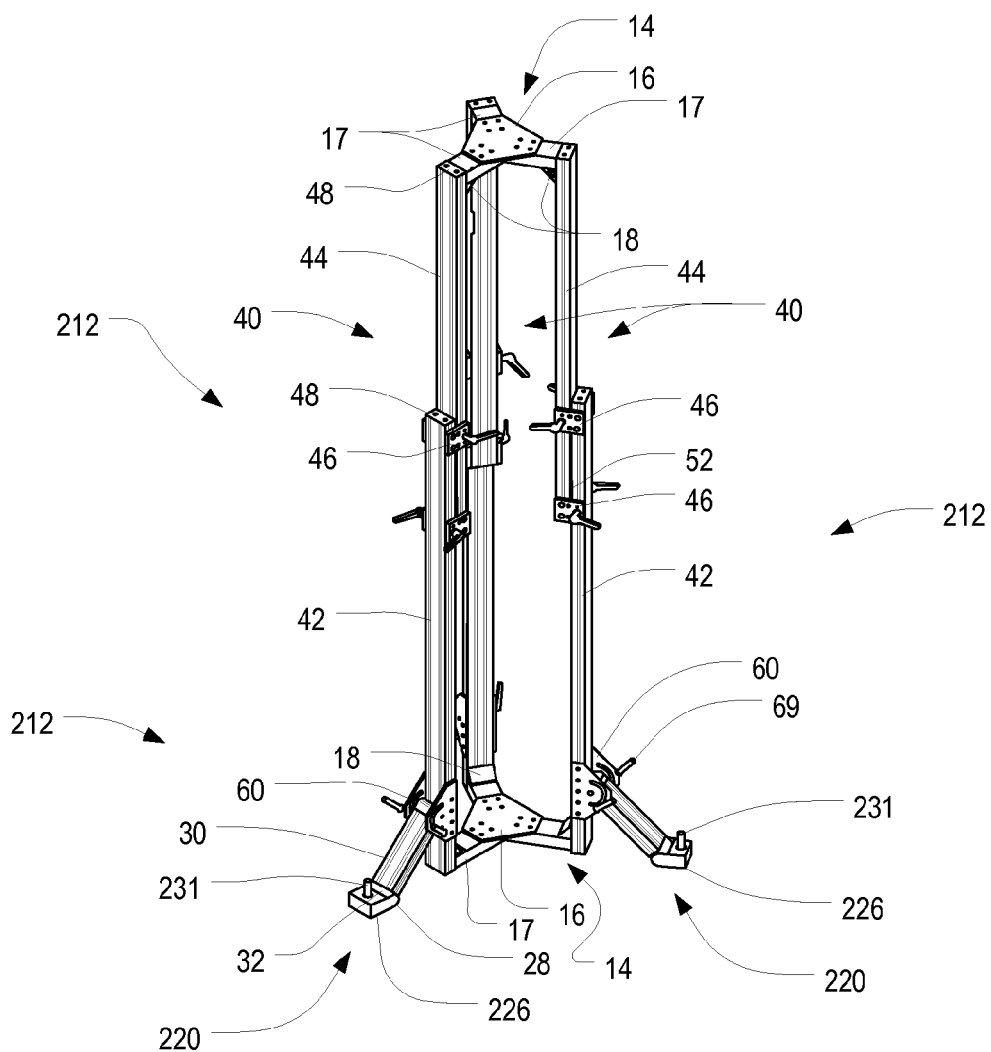
FIG. 19 is an isometric view of an exercise apparatus in accordance with one or more preferred embodiments of the present invention, shown in its use state.

In some embodiments, the platform assemblies 20 may be omitted. In this regard, FIG. 19 is an isometric view of an exercise apparatus 210 in accordance with one or more preferred embodiments of the present invention, shown in its use state. Generally like the apparatus 10 of FIGS. 1-7, the exercise apparatus 210 includes a plurality of stations 212 connected together via one or more harness assemblies 14. FIG. 2 is an isometric view of one of the stations 212 of FIG. 1. In at least some embodiments, the stations 212 are similar to one another, while in others a station 212 similar those described herein may be combined with one or more stations or other units of different design. Each station 212 in FIG. 1 includes an adjustable anchoring assembly 220 coupled to the bottom of a riser assembly 40 via an adjustable hinge joint 60. Each adjustable anchoring assembly 220 includes a hinge assembly 28, an extension strut or gusset 30, and a support foot 226 that may be anchored to the ground via a stake, bolt 231 or the like. The hinge assembly 28 is integral with, or connected to, the support foot 226, and is hingedly connected to the extension strut 30 via a hinge component 32 at one end of the strut 30. In at least some embodiments, the extension strut 30 is of extruded construction. Also in at least some embodiments, the hinge component 32 may include a 180 degree living hinge, and/or the adjustable hinge joint 60 may include a 180 degree hinge plate.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A portable exercise apparatus comprising:
   a plurality of separately usable workout stations, each station adapted for use by an athlete on sidelines of an athletic field, court, or other playing surface, wherein each workout station includes a riser assembly and a brace structure directly connected to a lower portion of the riser assembly to stabilize the riser assembly, and the apparatus, against the sidelines of the athletic field, court, or other playing surface;
   one or more harness assemblies connecting the plurality of workout stations together at at least an upper end of each respective riser assembly; and
   an adjustable exercise accessory disposed at a user-controlled height on at least one of the riser assemblies;
   wherein the workout stations may be collapsed relative to the one or more harness assemblies, the one or more harness assemblies may be collapsed relative to the workout stations, or both, without disassembly thereof, for transport to and from the sidelines of the athletic field, court, or other playing surface.

2. The portable exercise apparatus of claim 1, wherein the brace structure of each workout station includes an angled support that may be bolted to a ground or floor surface on the sidelines of the athletic field, court, or other playing surface and provides support for the riser assemblies, wherein each angled support extends radially outward from a point on the respective riser assembly that is elevated above the athletic field, court, or other playing surface and extends outwardly and downwardly from the elevated point toward the athletic field, court, or other playing surface.

3. The portable exercise apparatus of claim 1, wherein the brace structure of each workout station includes a platform assembly that rests on a ground or floor surface on the sidelines of the athletic field, court, or other playing surface and provides support for the riser assemblies.

4. The portable exercise apparatus of claim 3, wherein, in each workout station, the platform assembly is coupled to a bottom of the riser assembly via an adjustable hinge joint.

5. The portable exercise apparatus of claim 3, wherein each platform assembly includes an exercise pad that is large enough for a user having two feet to stand upon with both feet and that, in a use state, rests flat on the ground or floor surface on the sidelines of the athletic field, court, or other playing surface.

6. The portable exercise apparatus of claim 3, wherein each platform assembly is adjustable between a first state, in which the platform assembly rests on the ground or floor surface which is a horizontal support surface, and a second state, in which the platform assembly is folded vertically against the respective riser assembly.

7. The portable exercise apparatus of claim 1, wherein each riser assembly includes a lower riser and an upper riser that are coupled together along outer surfaces thereof such that the upper riser may be translated up and down relative to the lower riser.

8. The portable exercise apparatus of claim 7, wherein each lower and upper riser includes a primary column comprising a length of extruded material.

9. The portable exercise apparatus of claim 8, wherein each primary column includes a plurality of T-slots, wherein each T-slot extends substantially along the entire length of the respective primary column.

10. The exercise apparatus of claim 7, wherein each riser assembly includes a carriage bracket coupling the upper riser to the lower riser to facilitate the translation.

11. The portable exercise apparatus of claim 10, wherein each carriage bracket includes a clamp to fix the position of the upper riser relative to the lower riser.

12. The portable exercise apparatus of claim 1, wherein the one or more harness assemblies connect ends of the riser assemblies together.

13. The portable exercise apparatus of claim 1, wherein the riser assemblies of the plurality of workout stations are respectively connected spoke-like around at least one of the one or more harness assemblies.

14. The portable exercise apparatus of claim 1, wherein the adjustable exercise accessory is a first exercise accessory coupled to a first riser assembly, and wherein a second adjustable exercise accessory is coupled to a second riser assembly.

15. The portable exercise apparatus of claim 14, wherein the first exercise accessory and the second exercise accessory are of different types and perform different functions.

16. The portable exercise apparatus of claim 1, wherein the adjustable exercise accessory is removable from the at least one of the riser assemblies.

17. The portable exercise apparatus of claim 1, wherein the apparatus is adjustable from a use state to a transport state, without disassembly, such that it may be moved from a first use location to a second use location, and is further adjustable from the transport state to the use state, without assembly, such that it may be used in the second use location.

18. The portable exercise apparatus of claim 17, further comprising a plurality of wheels on which the apparatus is rolled in the transport state.

19. A portable exercise apparatus comprising:
   a plurality of separately usable workout stations, each workout station adapted for use by an athlete on sidelines of an athletic field, court, or other playing surface, wherein each workout station includes a riser assembly, including a lower riser and an upper riser that are coupled together such that the upper riser may be translated up and down relative to the lower riser, wherein each riser assembly has an upper end;
   a harness assembly connected to the respective upper end of each riser assembly to connect the plurality of workout stations together; and
   an adjustable exercise accessory disposed at a user-controlled height on at least one of the riser assemblies;
   wherein the workout stations may be collapsed relative to the harness assembly, the harness assembly may be collapsed relative to the workout stations, or both, without disassembly thereof, for transport to and from the sidelines of the athletic field, court, or other playing surface.

20. A portable exercise apparatus comprising:
   a plurality of separately usable workout stations, each workout station adapted for use by an athlete on sidelines of an athletic field, court, or other playing surface, wherein each workout station includes a riser assembly, including a vertical member having a channel running substantially along its entire length;

a harness assembly connecting the plurality of workout stations together; and an adjustable exercise accessory coupled to at least one of the riser assemblies, via the channel of the vertical member thereof, at a user-controlled height;

wherein the workout stations may be collapsed relative to the harness assembly, the harness assembly may be collapsed relative to the workout stations, or both, without disassembly thereof, for transport to and from the sidelines of the athletic field, court, or other playing surface.

* * * * *